United States Patent [19]
Gordon et al.

[11] 3,975,501
[45] Aug. 17, 1976

[54] FORMATION OF A FLUORINE COMPOUND AND THE COMPOUND

[75] Inventors: Joseph Gordon, Morris Township, Morris County; Bernard Sukornick, Elizabeth, both of N.J.

[73] Assignee: Allied Chemical Corporation, Morris Township, N.J.

[22] Filed: Apr. 26, 1963

[21] Appl. No.: 276,106

[52] U.S. Cl. ............................ 423/351; 423/466; 423/472
[51] Int. Cl.[2] .......................................... C01B 21/00
[58] Field of Search ............. 23/14, 190; 423/351, 423/466, 472

[56] References Cited
UNITED STATES PATENTS

| | | | |
|---|---|---|---|
| 3,077,377 | 2/1963 | Lawton et al. | 23/190 |
| 3,084,025 | 4/1963 | Gardner et al. | 23/14 |
| 3,101,997 | 8/1963 | Freeman et al. | 23/14 |

*Primary Examiner*—Stephen J. Lechert, Jr.
*Attorney, Agent, or Firm*—Ernest A. Polin; Jay P. Friedenson

EXEMPLARY CLAIM

1. The process for making dichlorofluoramine which comprises introducing into a reaction zone an alkali metal azide, subjecting said azide in said zone to the action of chlorine monofluoride while maintaining in said zone temperatures above the boiling point of dichlorofluoramine but not substantially above 150° C., and discharging from said zone reaction products containing dichlorofluoramine.

8 Claims, No Drawings

FORMATION OF A FLUORINE COMPOUND AND THE COMPOUND

This invention relates to dichlorofluoramine and to processes for making the same. Dichlorofluoramine, $FNCl_2$, is normally a colorless gas having a boiling point of about minus 2° to minus 3° C.

Major objects of the invention are to provide a previously unknown haloamine, and to afford feasible, procedurally simple methods for making dichlorofluoramine from available raw materials.

In accordance with the invention, it has been found that certain azides and chlorine monofluoride, ClF, b.p. minus 101° C., may be reacted under certain easily controlled conditions to form dichlorofluoramine. The invention comprises the discovery of the existence of dichlorofluoramine, of the reactability of chlorine monofluoride and the indicated azides to form dichlorofluoramine, and of certain reaction conditions which, together with the reactants, afford practicable and easily controlled methods for making the new haloamine.

In accordance with the invention, it has been found that sources of nitrogen for the dichlorofluoramine product may be supplied by the azides of the alkali metals, i.e. the azides of sodium, potassium, lithium, caesium and rubidium, preferably sodium and potassium. For convenient illustration, the invention is described mostly in connection with the use of sodium azide ($NaN_3$) and chlorine monofluoride which constitute preferred raw materials. Reaction conditions described as to these starting materials may be utilized with respect to the other alkali metals.

The processes of the invention may be carried out by procedurally simple contact reactions in which the reactants, aside from the permissive and usually desirable presence of inert diluent gases, preferably consists of chlorine monofluoride and the alkali metal azide. Mechanics of the reactions taking place are not clear or well understood. Reactions may proceed via a series of free radical intermediates. In the illustrative embodiment of use of e.g. sodium azide as the azide starting material, reactions may be summarized -

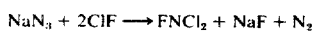

$$NaN_3 + 2ClF \longrightarrow FNCl_2 + NaF + N_2$$

In practice, the process of the invention involves introducing an alkali metal azide into a reaction zone, subjecting the azide therein to the action of chlorine monofluoride while maintaining in the reaction zone certain relatively low reaction temperatures, and discharging from the reaction zone gaseous reaction products containing dichlorofluoramine.

Apparatus employed in practice of all embodiments is simple, and may include any reactor suitably designed to facilitate contact of gaseous ClF with a body or bed of granulated or comminuted solid alkali metal azide. Alternatively, the reactor may be of the type in which solid alkali metal azide may be maintained in suspension in an inert liquid reaction medium. Whichever the type of reactor, the same may be jacketed and equipped with accessories to effect maintenance in the reactor of herein indicated reaction temperatures and with facilities for initial charging of substantially dry alkali metal azide, or charging with alkali metal azide suspended in an inert liquid reaction medium. The reactor may be provided at one end with valved inlets for metered charging of incoming gaseous chlorine monofluoride and gaseous diluent, and at the other end with a gas outlet which may be connected to the inlet of a cold trap system associated with refrigerating equipment to maintain the system at desired low temperatures. The final trap may include a gas vent to permit passage thru the trap of inert diluting gas and other gases uncondensable at the temperatures or refrigeration, and may be equipped with other valved outlets thru which, during a reaction run, liquid condensate may be drawn off to a fractionator or, following a reaction run, condensate may be fractionated off to recover dichlorofluoramine and to separate the same from other materials. In general, apparatus may be along the lines of that described in the appended Examples, and may be made of any suitable material such as nickel, copper, Monel, and stainless steel which is corrosive-resistant to the reactants, products and by-products involved.

At the outset of practice of a satisfactory embodiment in which reaction is carried out by contacting incoming chlorine monofluoride with e.g. sodium azide, substantially dry comminuted sodium azide is charged into the reactor. As introduced, the $NaN_3$ may be sized in the range of 200–800 mesh, preferably in the range of 300–500 mesh. Subsequent reaction, on introduction of ClF, is a dry-state gas-solid contacting operation.

Experience indicates desirability of use of chlorine monofluoride diluted with an inert gas such as nitrogen, helium, or argon. In the better practice, dilution of ClF with inert gas is a factor related to procurement of smooth reaction conditions throughout a run. Usually it is preferred to charge to the reactor a ClF-inert gas mixture having an inert gas volume dilution not less than 5–15%.

Reactions are moderately exothermic, and are carried out at relatively low temperatures. Reaction zone temperatures may be as high as about 150° C. and produce some $FNCl_2$. However, in the interest of better $FNCl_2$ yields lower temperatures are desirable. Reaction zone temperatures should be held a few practicable degrees C. above the boiling point of dichlorofluoramine, i.e. above minus 2° to minus 3° C., to insure maintenance of $FNCl_2$ in vapor phase in the reactor. On the basis of operation at substantially atmospheric pressure, usually reaction zone temperatures should be maintained substantially in the range of zero-125° C. and preferably substantially in the range of zero-80° C. For any given apparatus design and amount of $NaN_3$ charged, indicated temperature conditions may be maintained by regulation of ClF input.

While theory indicates one mol of azide for two mols of ClF, mol ratio per mol of azide may vary in the range of 0.3–4.0 mols of ClF, preferably at least about 0.75 mol of ClF. Indications are that the greater proportions of ClF, e.g. 1.75–4.0 per mol of $NaN_3$, tend to minimize presence of $ClN_3$ and $F_2ClN$ in the reactor off-gas.

Experience indicates that reactions between ClF and dry solid azides are usually characterized by an induction period during which significant quantities of $ClN_3$ and only minor amounts of $FNCl_2$ are formed. Depending more or less on the size of operation, induction time may vary from a few to 30 minutes or more. Hence, at the beginning of a run it is preferable to forego collection of reaction products and purge reactor off-gases from the system until continuous infrared analysis indicates substantial absence of $ClN_3$ in the reactor off-gas. In this connection, it has been found, however, that reaction induction period may be substantially shortened and formation of $ClN_3$ and possibly some $F_2NCl$ may be minimized by carrying out the reaction under conditions such that the alkali metal azide is maintained in suspension in an inert liquid reaction medium. Suitable inert liquids include 2,2,3-trichloropentafluorobutane, a cyclic perfluorinated ether empirically being $C_8F_{16}O$ and boiling at about 214° F., and a fluorinated amine available on the market as 3Ms FC-43. Relative proportions of azide and inert liquid are non-critical, and may be chosen to permit convenient suspension of the solid azide. In this embodiment, it is advantageous to pass the gaseous reactor exit immediately thru a minus 10°–20° C. cooled condenser arranged to condense and return to the reactor any diluent which may incidentally vaporize during reaction.

In all process embodiments, aside from inert diluents such as helium, the reactor exit contains principally $FNCl_2$ sought-for product, b.p. minus 2°–3° C., and elemental chlorine, b.p. minus 34° C.; some $ClN_3$, b.p. about minus 30° C.; some $F_2NCl$, b.p. minus 67° C.; nitrogen; possibly some unreacted $ClF$, b.p. minus 100°C., and smaller generally not more than trace amounts of $NF_3$, b.p. minus 125°–130° C., and fluorine. Recovery of dichlorofluoramine and separation of the same from other materials contained in the gaseous exit of the reaction zone may be effected more or less conventionally as known in this art, e.g. by condensation in the cold trap followed by suitable fractionation. Except for $ClF$, nitrogen, inerts, $NF_3$, and fluorine, the reactor exit may be totally condensed in a cold trap refrigerated to about minus 76°–80° C. by means of an acetone-dry ice mixture, materials non-condensable at that temperature being vented thru the trap. The crude condensate in the trap comprises principally sought-for $FNCl_2$ and a substantial amount of chlorine, plus relatively smaller amounts of $F_2NCl$, possibly some $ClN_3$. If desired, crude condensate in the trap may be vacuum pumped while the trap is maintained at the dry ice or lower temperature to remove any occluded non-condensables. To recover $FNCl_2$, the trap condensate may be subjected to low temperature distillation in a conventional all-metal still equipped with a vapor phase take-off. As temperature of the still is permitted to rise, substantially all constituents except $FNCl_2$ may be vaporized off until at pot temperature of around minus 15°–10° C. the pot residue remaining is $FNCl_2$ of purity of the order of 95–99%. Yields of substantially pure $FNCl_2$ are generally in the range of 15–25% on the basis of the $ClF$ charged.

Molecular weight determinations made by the Dumas method showed the recovered product to be in the monomeric state and have a molecular weight of about 104. Chemical analyses, for chlorine, fluorine and nitrogen, of products obtained from runs substantially the same as the runs of appended Examples 1 and 2 where crude products were purified by distillation, showed the following:

Found: F, 18.13%; Cl, 68.1; N, 13.47; Calcd. for $FNCl_2$ F, 18.28%; Cl, 68.24; N, 13.48.

Infrared spectrum of samples, obtained from runs of the Examples and from other substantially the same runs, showed strong bands at 12.0 and 12.2 microns substantiating the presence of an F–N linkage. Ultraviolet maximum was at 2700A which would be expected for an N–F compound of this type. Mass spectral analysis, such as delineated in Example 2, shows the presence of a parent peak in addition to peaks for $FNCl^+$, $FN^+$ and $^+NCl$, and the absence of any significant parent peak for $NF_2Cl$. $F^{19}$ nuclear magnetic resonance spectrum showed one peak at minus 128.7 ppm from $CFCl_3$ as a standard additionally establishing an N–F linkage. Further, decomposition of the compound to difluorodiazine and chlorine in the presence of ultraviolet light additionally established the

structure.

The dichlorofluoramine product of the invention is a highly reactive substance. It is useful as an intermediate in the synthesis of high energy oxidizers. Further, dichlorofluoramine is useful as a starting material to form difluorodiazine, FN=NF, a well known compound useful as an initiator for vinyl polymerization. Thus, $FNCl_2$ may be reacted with alkaline solutions to form FN=NF, and $FNCl_2$ may also be converted to FN=NF by ultraviolet radiation or by heating. For example, $FNCl_2$ contained in a cylindrical cell, 2.5 cm. dia. and 10 cm. long and equipped with sodium chloride windows, was irradiated by a 250 watt high pressure mercury lamp for about 20 minutes, at which time the $FNCl_2$ had been converted to FN=NF, chlorine and some $NF_3$, as shown by infrared analysis.

The following illustrate practice of the invention

Example 1

Apparatus comprised a copper U-tube reactor of ½ inch I.D. and of 24 inches axial length. The upper end of one leg of the tube was provided with a cover facilitating charging with solid comminuted sodium azide, and with a valved inlet for introduction of a gas. The upper end of the other leg of the reactor was connected thru a conduit to the gas inlet of a Monel dry ice trap (about minus 80° C.) the gas outlet of which was pipe-connected to the gas inlet of a stainless steel liquid nitrogen trap (about minus 196° C.) having a gas outlet vented to the atmosphere. The reactor was charged with about 15 g. (0.23 m.) of sodium azide ($NaN_3$) of about 400 mesh. Chlorine monofluoride gas was diluted with nitrogen to a volume ratio of about 95 ClF to 5 nitrogen, and the mixture was charged into the gas inlet of the reactor. Introduction of the mixture was such as to provide feed to the reactor of chlorine monofluoride at a rate of about 2.85 g. per hour for a total time period of about 6.5 hours. Mol ratio of reactants charged was about 1.5 m. of ClF per mol of $NaN_3$. During the course of the run, reaction temperatures ranged from about 20° C. at the start to about 125° C. at the end. For about the first 30 minutes of the run, off-gases of the reactor were vented thru an infrared cell. After the latter indicated the absence of chlorine azide ($ClN_3$), the reactor off-gas stream was passed successively thru the dry ice and liquid nitrogen traps. At the end of the run the dry ice trap contained about 8.5 g. of liquid material, and weight increase of the liquid nitrogen trap was about 3.5 g. The contents of the dry ice trap were partially purified by pumping out while temperature of the trap was lowered to and held at about minus 196° C. Infrared analysis of a sample of the partially purified material condensed and recovered in the dry ice trap showed strong bands at about 12 and 12.2 microns showing the presence of $FNCl_2$. Mass spectrographic analysis of another sample gave data generally similar to those noted below in connection with Example 2. $F^{19}$ nuclear magnetic resonance analysis of another sample of the dry ice trap condensate showed one peak at minus 128.7 ppm. from $CFCl_3$ as a standard demonstrating the presence of an N–F linkage. Dry ice trap products of several runs, similar to the above, were combined and purified by distillation. Based on the total amount of ClF used in the combined runs and the total amount of purified $FNCl_2$ recovered, yield of purified $FNCl_2$ was about 24%. Other similar composite recoveries of purified $FNCl_2$ showed yield of about 17% on basis of ClF used.

Example 2

The reactor of Example 1 was charged with about 15 g. of sodium azide. Chlorine monofluoride (diluted with helium to a volume ratio of about 95 ClF to 5 helium) was introduced into the reactor at such a rate that over the course of about 4.5 hrs. a total of 15 g. of ClF was fed. Mol ratio was about 1.4 m. of ClF per mol of $NaN_3$. Reaction temperature varied from about 20° C. at the start to about 125° C. No extraneous cooling of the reactor was employed. For about the first 30 minutes of the run, reactor off-gases were passed thru an infrared cell, i.e. until formation of $ClN_3$ ceased. At the end of the run, liquid material collected in the dry ice trap amounted to about 5.4 g. of crude liquid product. Temperature of the trap was lowered to that of liquid nitrogen, and all non-condensables were pumped out. Ultraviolet analyses of a sample of the partially purified product showed the presence of a substantial amount of $Cl_2$. Infrared analysis of a sample showed a strong band at 12 microns. Mass spectrograph analysis (Consolidated Electrodynamics Model 21-103 Mass Spectrometer) gave the following data:

| | (Magnet current 1 M.C.) | = | 0.550 |
| | (Voltage | = | 70 |
| | (Current | = | 52.5 |
| | (Inlet pressure | = | 65.50 |
| m/e | Ion | | Relative Intensity |
| --- | --- | --- | --- |
| 14 | $N^+$ | | 16.8 |
| 19 | $F^+$ | | 5.2 |
| 24.5 | $NCl_{35}^{+2}$ | | 0.80 |
| 25.5 | $NCl_{37}^{+2}$ | | 0.28 |
| 33 | $NF^+$ | | 17.5 |
| 49 | $NCl_{35}^+$ | | 100 |
| 51 | $NCl_{37}^+$ | | 32.2 |
| 68 | $NCl_{35}F^+$ | | 77.9 |
| 84 | $NCl_2(35-35)$ | | 1.6 |
| 86 | $NCl_2^+(35-37)$ | | 1.1 |
| 88 | $NCl_2^+(37-37)$ | | 0.19 |
| 103 | $NCl_2F^+(35-35)$ | | 1.68 |
| 105 | $NCl_2F^+(37-35)$ | | 1.05 |
| 107 | $NCl_2F^+(37-37)$ | | 0.20 |

The foregoing establishes that the crude, partially purified material recovered in the cold trap was a liquid mixture of dichlorofluoramine,

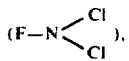

and chlorine.

Example 3

The reactor of Example 1 was charged with about 25 g. of $NaN_3$, and immersed in an ice-water bath. Chlorine monofluoride (diluted with nitrogen to a volume ratio of about 95 ClF to about 5 nitrogen) was passed into and thru the reactor at a rate of about 0.72 g. per hour for a total of about 20 hrs. Mol ratio was about 0.85 m. of ClF per mol of $NaN_3$. On termination of chlorine azide formation (after about the first 30 minutes), the reactor off-gas was passed thru two dry ice traps connected in series. Rate of feed of ClF and ice-water bath cooling were such that reaction temperature varied from about zero degress C. at the start to a maximum of 75°–80° C. At the end of the run, the first cold trap contained about 6.5 g. of liquid condensate, while the second trap showed no weight gain. The condensate in the first trap was partially purified by pumping out non-condensables while the trap was immersed in a liquid nitrogen bath. During the pumping out, the trap lost about 2.1 g. of weight leaving about 4.4 g. of liquid material in the trap. Infrared analysis of a sample of the partially purified dry ice trap condensate showed a large concentration at 12 microns, i.e. $FNCl_2$, and also a fair amount of $F_2NCl$. Gas density analysis showed the sample to contain $Cl_2$ in amount substantially greater than that of the $F_2NCl$. Mass spectrum analysis showed a pattern similar to that detailed in Example 2.

Example 4

The reactor of Example 1 was charged with about 20 g. of $NaN_3$. Undiluted chlorine monofluoride was passed into and thru the reactor at low flow rate such that over the course of about 13.6 hrs., about 6 to 8 g. of ClF were passed thru the reactor. During all of the run, the reactor was immersed in an ice-water bath, and reaction temperatures were substantially the same as in Example 3. On termination of chlorine azide formation, (after about the first 30–40 minutes) the reactor off-gas was passed thru a dry ice trap. At the end of the run, condensate in the trap was partially purified by pumping out non-condensables while the trap was immersed in a liquid nitrogen bath. After pumping out, the crude product recovered as cold trap condensate amounted to about 3.2 g. Infrared analysis of a sample of the partially purified dry ice condensate showed a substantial concentration of 12 microns, i.e. $FNCl_2$ and also some $F_2NCl$, but virtually no other gases.

Example 5

A 3-necked Monel flask of about 250 cc. capacity was charged with about 3 g. of sodium azide suspended in about 130 ml. of an inert liquid reaction medium which was a cyclic perfluorinated ether of the empirical formula $C_8F_{16}O$ and having a boiling point of about 214° F. Chlorine monofluoride, diluted with helium to a volume ratio of about 90 ClF to about 10 helium, was bubbled thru the suspension at a rate of about 160 bubbles/min. for a total time of about 4 hrs., during which period about 9.6 g. of ClF were passed thru the flask. Mol ratio of reactants charged was about 3.8 m. of ClF per mol of $NaN_3$. All during reaction, the material in the flask was agitated to keep the $NaN_3$ in suspension, and the flask was immersed in an ice water bath which maintained reaction temperature at about zero–15° C. The off-gases of the flask were passed thru an infrared cell which showed the presence in the reactor off-gas of $FNCl_2$ but no detectable $CN_3$ or $F_2NCl$.

We claim:

1. The process for making dichlorofluoramine which comprises introducing into a reaction zone an alkali metal azide, subjecting said azide in said zone to the action of chlorine monofluoride while maintaining in said zone temperatures above the boiling point of dichlorofluoramine but not substantially above 150° C., and discharging from said zone reaction products containing dichlorofluoramine.

2. The process of claim 1 in which temperatures are substantially in the range of zero–125° C.

3. The process of claim 1 in which temperatures are substantially in the range of zero–80° C., and the azide is selected from the group consisting of sodium and potassium.

4. The process for making dichlorofluoramine which comprises introducing sodium azide into a reaction zone, subjecting said azide in said zone to the action of chlorine monofluoride while maintaining in said zone temperatures substantially in the range of zero–80° C., and discharging from said zone reaction products containing dichlorofluoramine.

5. The process of claim 4 in which sodium azide is suspended in an inert liquid reaction medium and mol ratio of ClF to $NaN_3$ is substantially in the range of 1.75–4.0 mols of ClF per mol of $NaN_3$.

6. The process for making dichlorofluoramine which comprises subjecting comminuted, substantially dry sodium azide in a reaction zone to the action of chlorine monofluoride while maintaining in said zone temperatures substantially in the range of zero–80° C., discharging from said zone reaction products containing dichlorofluoramine, and recovering dichlorofluoramine from said products.

7. The process of claim 6 in which mol ratio of ClF to $NaN_3$ is substantially in the range of 0.75–4.0 mols of ClF per mol of $NaN_3$.

8. The compound dichlorofluoramine, $FNCl_2$.

* * * * *